United States Patent
Natanson et al.

(10) Patent No.: US 6,606,321 B1
(45) Date of Patent: Aug. 12, 2003

(54) METHOD OF ESTABLISHING MPOA SHORTCUT VIRTUAL CHANNEL CONNECTIONS

(75) Inventors: Sarit Shani Natanson, Tel Aviv (IL); Lior Katzri, Givaataim (IL); Benny Gershon, Rehovot (IL); Dror Goldstein, Tel Aviv (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/474,675

(22) Filed: Dec. 29, 1999

(51) Int. Cl.[7] .............................................. H04L 12/28
(52) U.S. Cl. ..................... 370/395.2; 709/227; 714/749
(58) Field of Search .............................. 370/216, 395.2, 370/395.4; 709/227, 230; 710/20; 714/18, 749

(56) References Cited

U.S. PATENT DOCUMENTS

| | | | | |
|---|---|---|---|---|
| 5,912,903 A | * | 6/1999 | Nakayashiki et al. | ........ 714/749 |
| 6,081,525 A | * | 6/2000 | Christie et al. | .............. 370/392 |
| 6,125,123 A | * | 9/2000 | Furuno | ........................ 370/467 |
| 6,181,700 B1 | * | 1/2001 | Doi | .......................... 370/395.2 |
| 6,279,035 B1 | * | 8/2001 | Brown et al. | ................ 709/224 |
| 6,385,170 B1 | * | 5/2002 | Chiu et al. | ................... 370/235 |
| 6,418,126 B1 | * | 7/2002 | Gilmurray et al. | ........ 370/310.1 |
| 6,421,321 B1 | * | 7/2002 | Sakagawa et al. | ........ 370/238.1 |
| 6,452,921 B1 | * | 9/2002 | Alexander et al. | .......... 370/351 |

OTHER PUBLICATIONS

Williams MPOA: routing multiple protocols over ATM. IEE Colloquium, Nov. 19, 1997 Digest 1997/334, p2/1–2/5.*
CISCO IOS Switching Services Configuration Guide, LAN Emulation Overview, pp. XC–59–65.
LAN Emulation Over ATM Version 2—LUNI Specification—Letter Ballot, AF–LANE–0084.000, pp. 25–26, 29–33, 88–101.
LAN Emulation Over ATM, 1996, pp. 1–11.
ATM Forum Technical Committee, LAN Emulation Over ATM—Version 1.0, AF–LANE–0021.000, pp. 30–32, 100.
AF–MPOA–0087.000, MPOA Version 1, pp. 56–63.

* cited by examiner

Primary Examiner—Hassan Kizou
Assistant Examiner—Dmitry Levitan
(74) Attorney, Agent, or Firm—Howard Zaretsky; Paul J. Sutton

(57) ABSTRACT

A method of establishing calls between an ingress MPC (the calling party) and an egress MPC (the called party) in MPOA enabled ATM based networks. The call establishment method utilizes the call request SETUP, CONNECT and CONNECT_ACK messages in creating the shortcut VCC between ingress and egress MPCs. The calling party is adapted to send a READY_IND message in a reliable manner to the called party indicating that it is ready to receive frames over the shortcut VCC. The called party starts sending data over the shortcut VCC only when it knows that the calling party is ready. The called party knows the calling party is ready upon receipt of a READY_IND message or at least one data frame on the shortcut VCC. The calling party knows that the called party is ready to receive frames when it receives the CONNECT message. Since the READY_IND message sent by the calling party may get lost, the calling party is adapted to re-send the READY_IND message repeatedly until it is certain the called party has received it. The calling party utilizes a timer whereupon expiration, the READY_IND message is re-sent to the called party and the timer is restarted.

14 Claims, 6 Drawing Sheets

METHOD OF ESTABLISHING MPOA SHORTCUT VIRTUAL CHANNEL CONNECTIONS

FIELD OF THE INVENTION

The present invention relates generally to data communication systems and more particularly relates to a method of establishing MPOA short cut virtual circuit connections (VCCs).

BACKGROUND OF THE INVENTION

Multi-Protocol Over ATM (MPOA)

The majority of networks, e.g., IP networks, are constructed from a plurality of nodes grouped together to form one or more subnets. Subnets are often built using various LAN technologies, with Ethernet and Token Ring being the most popular. Nodes in different subnets cannot normally communicate with each other. A router permits a node in one subnet to communicate with a node on a different subnet. Most internetwork layer protocols utilize routers to permit communications across subnet boundaries.

LAN Emulation (LE), as defined by the ATM Forum, provides Emulated LANs (ELANs) which emulate the services of Ethernet and Token Ring LANs across an ATM network. LE allows a subnet to be bridged across an ATM/LAN boundary. LE permits a single ATM network to support multiple ELANs. Utilizing ELANs, internetwork layer protocols can operate over an ATM network in essentially the same way they operate over Ethernet or Token Ring LANs. Although LE provides an effective means for bridging intra-subnet data across an ATM network, internetwork traffic still must be forwarded through routers.

The Next Hop Resolution Protocol (NHRP) and Multicast Address Resolution Server (MARS) protocols defined by the Internetworking Over NBMA (ION) Working Group, also permit internetwork layer protocols to operate over an ATM network. These protocols permit the ATM network to be divided into multiple ION subnets, also known as Logical IP Subnets (LISs) or Local Access Groups (LAGs). Routers are required, however, to interconnect these subnets. NHRP, however, allows intermediate routers to be bypassed on the data path. NHRP provides an extended address resolution protocol that permits Next Hop Clients (NHCs) to send queries between different subnets. Queries are propagated by Next Hop Servers (NHSs) along the routed path as determined by standard routing protocols. This enables the establishment of ATM VCCs across subnet boundaries, permitting inter-subnet communication without requiring routers in the data path.

Notwithstanding the availability of LANE and NHRP, a common situation exists wherein communicating LAN devices are behind LANE edge devices. The use of Multi-Protocol Over ATM (MPOA) permits these edge devices to perform internetwork layer forwarding and establish direct communications without requiring that the LANE edge devices comprise full function routers.

MPOA functions to provide an efficient transfer of inter-subnet unicast data in a LE environment. MPOA integrates LE and NHRP so as to preserve the benefits of LE, while allowing inter-subnet, internetwork layer protocol communication over ATM VCCs without requiring routers in the data path. MPOA provides a framework for effectively synthesizing bridging and routing with ATM in an environment of diverse protocols and network technologies. This framework provides a unified paradigm for overlaying inter-network layer protocols on ATM. MPOA is capable of using both routing and bridging information to select a shortcut through the ATM cloud to the egress MPC.

MPOA permits the physical separation of internetwork layer route calculation and forwarding, a technique known as virtual routing. This separation has the advantages of: (1) allowing efficient inter-subnet communications; (2) increasing manageability by decreasing the number of devices that must be configured to perform internetwork layer route calculation; (3) increases scalability by reducing the number of devices participating in internetwork layer route calculation; and (4) reduces the complexity of edge devices by eliminating the need to perform internetwork layer route calculation.

MPOA provides MPOA Clients (MPCs) and MPOA Servers (MPSs) and defines the protocols that are required for MPCs and MPSs to communicate. MPCs function to issue queries for shortcut ATM addresses and to receive replies from the MPS using these protocols. MPOA also functions to ensure interoperability with the existing infrastructure of routers. MPOA Servers utilize routers that run standard internetwork layer routing protocols, e.g., OSPF, providing a smooth integration with existing networks.

The primary function of the MPC is to source and sink internetwork shortcuts. The MPC performs internetwork layer forwarding but does not run internetwork layer routing protocols. The MPC detects ingress flows of packets that are forwarded over an ELAN to a router that comprises an MPS. When it recognizes a flow that could benefit from a shortcut that bypasses the routed path, it uses an NHRP based query/response protocol to request the information required to establish a shortcut to the destination. If a shortcut is available, the MPC caches the information in its ingress cache, sets up a shortcut VCC and forwards frames for the destination over the shortcut.

The MPC receives egress internetwork data frames from other MPCs to be forwarded to its local interface and/or users. For frames received over a shortcut, the MPC adds the appropriate encapsulation/header and forwards them to the higher layers. The encapsulation is provided to the MPC by the egress MPS and stored in the egress cache in the MPC. Note that an MPC is able to service multiple LECs and communicates with multiple MPSs. In addition, there may be multiple MPCs in an edge device. A given LEC, however, may be associated with only a single MPC.

An MPS is the logical component of a router that provides internetwork layer forwarding information to the MPCs. It comprises a full NHRP implementation with extensions as defined in the ATM Forum Multi-Protocol Over ATM Specification Version 1.0, AF-MPOA-0087.000, July 1997, incorporated herein by reference in its entirety. The MPS interacts with its local NHS and routing functions to reply to MPOA queries from ingress MPCs and provides encapsulation information to egress MPCs. Note that an MPS converts between MPOA requests and replies and NHRP requests and replies) on behalf of MPCs. In addition, there may be multiple MPSs in a router. A given LEC, however, may be associated with only a single MPS.

An MPOA solution generally comprises a plurality of MPOA control flows and MPOA data flows. All control and data flows are carried over ATM VCCs. Control flows use MPOA control VCCs. Note that these VCCs can be used for other protocols (e.g., LE, etc.) as well in a multiplexed mode. Data flows, on the other hand, are carried over either LE VCCs (i.e., the default path) or over shortcut VCCs established via MPOA.

MPOA performs the following operations: configuration, discovery, target resolution, connection management and data transfer. Configuration is obtaining the appropriate configuration information in both MPC and MPS. Normally, MPOA components receive configuration information from the LECS. Discovery involves MPCs and MPSs learning of each other's existence. MPOA components automatically discover each other using extensions to the LE LE_ARP protocol that convey the MPOA device type (i.e., MPS, MPC) and ATM address. This information may change and must be periodically verified and updated if necessary. An MPOA device type TLV can be included in the following LE messages: LE_REGISTER request and response, LE_ARP request and response and targetless LE_ARP request.

Target resolution denotes the determining of the mapping of a target to an egress ATM address, an optional tag and a set of parameters used to setup a shortcut to forward packets across subnet boundaries.

Connection management entails creating, maintaining and terminating VCCs for the purpose of transferring control information and data. MPOA components establish VCCs between each other as necessary to transfer control and data messages over the ATM network. The goal of MPOA is the efficient transfer of unicast data within the ATM cloud. Unicast data flow can comprise either the default flow or the shortcut flow. The default flow follows the routed path over the ATM network whereby the MPOA edge device functions as a layer 2 bridge. Shortcuts are established using the MPOA target resolution and cache management mechanisms. When an MPC has an internetwork protocol packet to send for which it has a shortcut, the MPOA edge device functions as an internetwork level forwarder and sends the packet over the shortcut.

A block diagram illustrating an example MPOA network comprising a plurality of MPSs and MPCs wherein the default path and shortcut path are highlighted, is shown in FIG. 1. The network, generally referenced 10, comprises a source end station 22, plurality of MPCs 12, labeled MPC #1 and #2, a plurality of ELANs 14, a plurality of MPSs 16, labeled INGRESS MPS #1 and EGRESS MPS #2, destination end station 24 and ATM cloud 26. The default path is represented by dashed arrow 18 while the shortcut is represented by solid arrow 20.

The ingress MPC (e.g., MPC #1) learns the MAC addresses of the MPSs (e.g., MPS #1) attached to its ELANs from the device type TLVs in LE_ARP responses. The MPC performs flow detection, based on internetwork layer destination addresses, on packets destined for these learned MAC addresses. Although default forwarding is via routers, if an MPC becomes aware of a particular traffic flow that might benefit from a shortcut, the ingress MPC then determines the ATM address associated with the egress device. The ingress MPC sends an MPOA Resolution Request message to the appropriate ingress MPS in order to obtain the ATM address for a shortcut. The MPS resolves the MPOA Resolution Request and a reply is returned to the ingress MPC containing the ATM address of the egress device.

The ingress MPS processes MPOA Resolution Requests sent by local MPCs. It may answer the request if the destination is local or it may re-originate the request along the routed path through its local NHS.

When an NHRP Resolution Request targeted for a local MPC arrives at the egress MPS serving that MPC, the egress MPS sources an MPOA Cache Imposition Request and sends it to the egress MPC. This request is part of the cache management protocol that serves to provide encapsulation and state maintenance information needed by the egress MPC (e.g., MPC #1). The corresponding reply provides status, address and ingress tagging information needed by the egress MPS (e.g., MPS #2) to form the NHRP Resolution Reply.

The egress MPC (e.g., MPC #2) checks to determine whether it has sufficient resources to maintain the cache entry and potentially receive a new VCC and replies accordingly. The egress MPS sends an MPOA Cache Imposition Reply for every MPOA Cache Imposition Request.

With reference to FIG. 1, a packet generated by the source end station enters the MPOA system at the ingress MPC (MPC #1). The MPC creates a new cache entry for new flows that are detected. If a valid shortcut does not already exist for the flow, the MPC begins counting frames. When a threshold is exceeded, a MPOA Resolution Request is sent to the MPS to request a shortcut. By default, the packet is bridged via LE to a router. If the packet is not to follow the default path, i.e., it is part of a flow for which a shortcut has previously been established, it is send via the shortcut. If the packet comprises a new flow, each packet sent to an MPS is logged and counted (by internetwork layer destination address) as it is being sent via LE. When a threshold (a number of packets within a given period of time) is exceeded, the MPC sends an MPOA Resolution Request to obtain the ATM address to be used for establishing a shortcut to a particular downstream element (e.g., an egress MPC).

When the packet arrives at the egress MPC (e.g., MPC #2) via the shortcut, it is examined and either a matching egress cache entry is found or the packet is dropped and an error is indicated. If a match is found, the packet is encapsulated using the information in the egress cache and then forwarded to a higher layer.

As described previously, the MPOA standard includes a mechanism for automatically discovering other devices in a dynamic manner. More specifically, an MPOA device is uniquely identified by its control ATM address that is discovered by neighboring MPOA devices. Note that it is important for MPOA Clients to have knowledge of the MAC and ATM addresses of the local MPOA Servers in order that MPOA requests may be sent. Further, the MPOA Server must know if an NHRP request resolved to the ATM address of an MPOA Client so that a cache imposition may be sent. In addition, MPOA Servers that share an ELAN must be able to discover the existence of each other in order to facilitate the forwarding of NHRP messages.

To accomplish the above requirements, the MPOA discovery process is based on the mechanism provided for by LANE messaging which has been extended with MPOA Device Type TLVs (Type, Length, Value), e.g., LE_ARP control frames.

As described above, an ingress MPC establishes a short cut VCC to an egress MPC in order to improve communications performance. In Switched Virtual Circuit (SVC) environments the MPOA entities set up bidirectional point to point connections between each other using standard UNI signaling as described in ATM Forum User-to-Network (UNI) Signaling Version 3.0/3.1 specification. To establish a short VCC, the call establishment procedure outlined in the LAN Emulation Over ATM Version 1.0 specification can be used.

A message flow diagram illustrating the call establishment message flow of prior art LANE entities is shown in FIG. 2. The calling party (e.g., the ingress MPC) initiates the call request by sending the SETUP message (30) to the called party (e.g., the egress MPC). Note that the SETUP, CON- NECT and CONNECT_ACK messages are the SVC call establishment messages specified in the ATM UNI Signaling Specification Version 3.0/3.1. The READY_IND and READY_QUERY messages are defined in the LANE specification.

In accordance with the LANE specification, when a call is being setup, the called party does not send a CONNECT message (32) until it is ready to receive frames on the new VCC. The CONNECT message contains an implied ready from the called party. The calling party, therefore, can assume that it can transmit frames only after it has received the CONNECT message.

A problem arises, however, when using UNI signaling 3.0/3.1 to create bidirectional shortcut VCCs in that the called party cannot determine when the connection has been established end-to-end. This is because the CONNECT_ACK message (34) received by the called party may have been generated by its local switch and not the calling party. In this case, the CONNECT_ACK message received by the called party is not an end-to-end indication from the calling party and it may be received before the calling party has received the CONNECT message. The calling party can only set itself up to receive frames on the VCC after it receives a CONNECT message which indicates the allocation of VPI/VCI numbers. As a result, the called party may start to forward frames over the VCC before the calling party is ready to receive frames on the newly created VCC. Thus, the called party has no guarantee that the calling party will receive its initial data until the called party received some kind of end-to-end indication from the calling party. If the calling party is not ready to receive data frames, the associated edge device will drop packets and/or the associated switch will drop cells.

The LANE specification augments the standard call establishment procedure by adding the READY_IND and READY_QUERY messages. The calling party sends a READY_IND message (36) as soon as it is ready to receive frames on the newly established VCC. At that point, the calling party considers call establishment to be complete. The called party will not begin transmitting data until it receives the READY_IND message. The calling party may send data as soon as it is ready to receive frames on the newly established VCC. Note that data may be sent before or after the sending of the READY_IND message.

Since the READY_IND message from the calling party may get lost, the called party is responsible for starting a timer after sending the CONNECT message. Further, since the called party does not know in advance how long it takes for the CONNECT message to arrive to the calling party, the duration of the timer is relatively long, being four seconds by default. If the timer expires before the READY_IND is received, the called party sends data or a READY_QUERY message (38) over the VCC. Note that both parties always respond to receipt of a READY_QUERY message on an active VCC by transmitting a READY_IND message (40).

Even with the augmented call establishment procedure of the LANE Version 1.0 specification, the problem still exists whereby the called party may start forwarding data frames to the calling party over the newly established VCC before the calling party is ready to receive frames. Further, in the event the READY_IND message gets lost, communications do not begin until after a relatively long time period has passed.

The MPOA standard does not address this call establishment problem but does suggest in Section 4.8.7 that an MPOA component can establish a dedicated unidirectional VCC for the shortcut. This, however, is not an optimum solution when bidirectional communications is required since two unidirectional VCCs must be established.

SUMMARY OF THE INVENTION

The present invention is a method of establishing calls between an ingress MPC (the calling party) and an egress MPC (the called party) in MPOA enabled ATM based networks. The present invention comprises a plurality of methods, a portion of which are intended to operate on the ingress MPC and a portion of which are intended to operate on the egress MPC.

The invention is suitable for use in MPOA devices that have associated edge devices or switches running ATM UNI Signaling Version 3.0 or 3.1. The call establishment method of the present invention method utilizes the call request SETUP, CONNECT and CONNECT_ACK messages in creating the shortcut VCC between ingress and egress MPCs.

The key feature of the method of the present invention is that the calling party is adapted to send a READY_IND message in a reliable manner to the called party indicating that it is ready to receive frames over the shortcut VCC. The called party starts sending data over the shortcut VCC only when it knows that the calling party is ready. The calling party knows that the called party is ready to receive frames when it receives the CONNECT message.

Since the READY_IND message sent by the calling party may get lost, the calling party is adapted to re-send the READY_IND message repeatedly until it is sure the called party has received it. The calling party utilizes a timer wherein, upon expiration, the READY_IND message is re-sent to the called party and the timer is restarted.

There is provided in accordance with the present invention, in an Asynchronous Transfer Mode (ATM) based Multiple Protocol Over ATM (MPOA) network, a method of establishing a bidirectional shortcut Virtual Channel Connection (VCC) between a calling party and a called party, the method comprising the steps of initiating a call request by sending a setup message from the calling party to the called party, initializing the called party and sending a connect message to the calling party, initializing the calling party and sending a ready indication message to the called party on the shortcut VCC when the calling party is ready to receive data, periodically re-sending the ready indication message to the called party until a ready acknowledge message or data frame is received by the calling party and sending data from the called party to the calling party upon receipt by the called party of the ready indication message or at least one data frame.

The step of initializing the call request comprises the step of sending a SETUP request message as described in the ATM User-to-Network (UNI) Signaling 3.0/3.1 standard. The step of sending a connect message comprises the step of sending a CONNECT message as described in the ATM User-to-Network (UNI) Signaling 3.0/3.1 standard. The step of initializing the called party may comprise the step of initializing the shortcut VCC and associated Segmentation and Reassembly (SAR) function. The step of initializing the calling party comprises the step of initializing the shortcut VCC and associated Segmentation and Reassembly (SAR) function. The ready indication message comprises an MPOA Control Message adapted to have a fixed header comprising an indication identifying the message as a ready indication message.

The step of periodically re-sending the ready indication message comprises starting a timer and restarting the timer upon its expiration. The method further comprises the step of sending data from the calling party to the called party upon receipt by the calling party of a connect message. The ready acknowledge message comprises an MPOA Control Message adapted to have a fixed header comprising an indication identifying the message as a ready acknowledge message.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
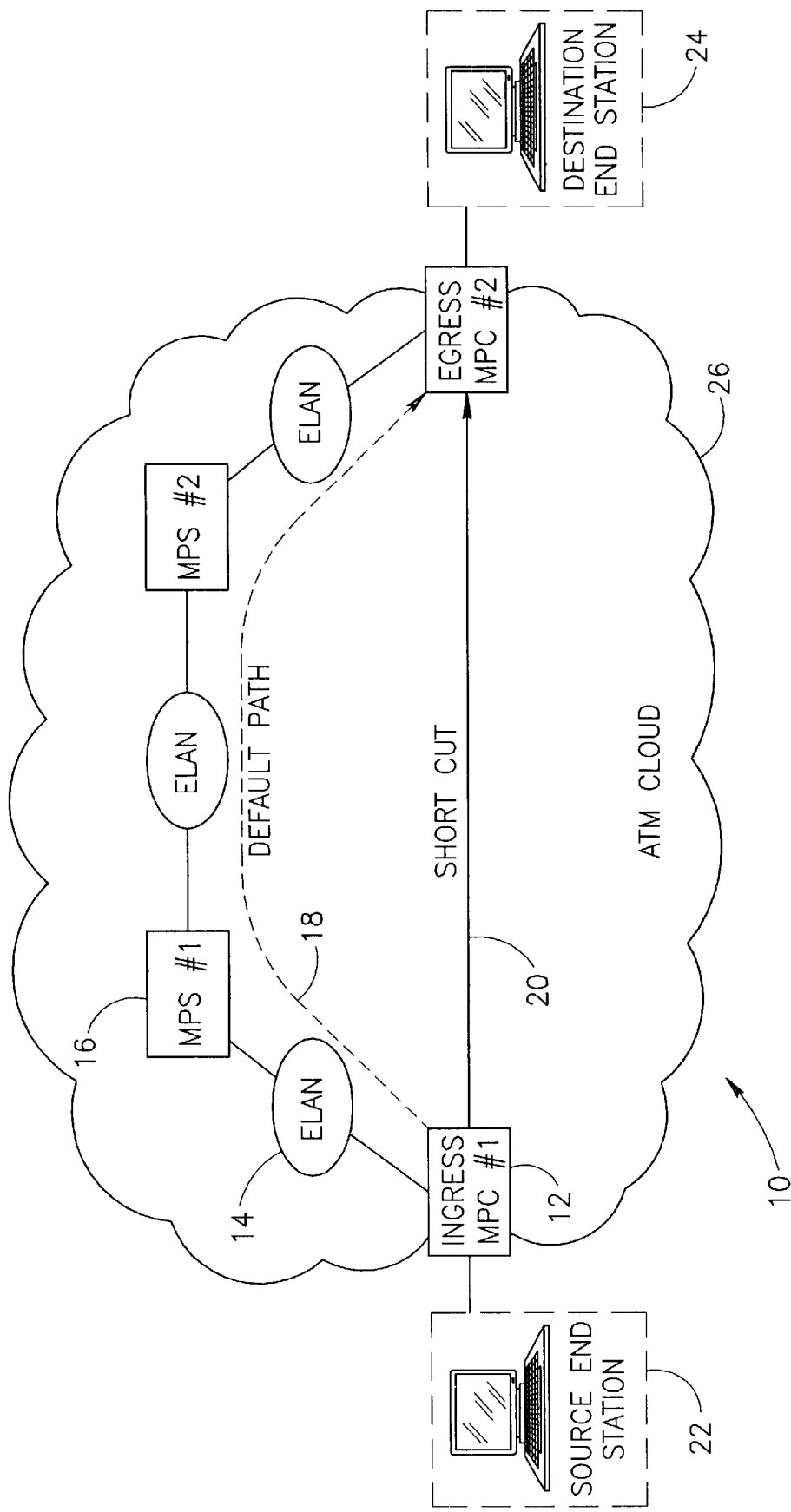
FIG. 1 is a block diagram illustrating an example MPOA network comprising a plurality of MPSs and MPCs.
Figure 2:
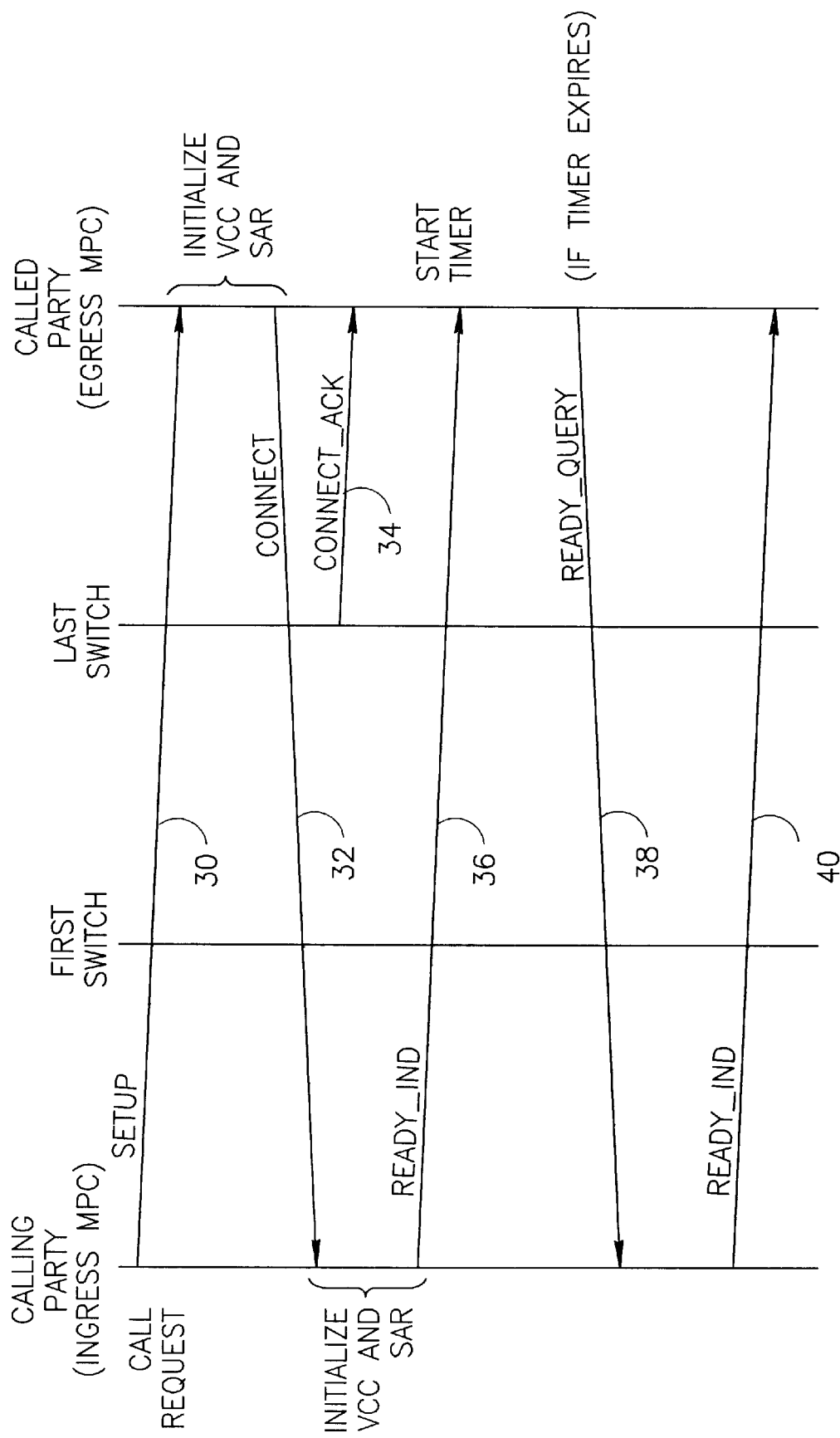
FIG. 2 is a message flow diagram illustrating the call establishment message flow of prior art MPOA entities.

The following notation is used throughout this document.

| Term | Definition |
|---|---|
| ARP | Address Resolution Protocol |
| ATM | Asynchronous Transfer Mode |
| DDVC | Data Direct Virtual Circuit |
| ELAN | Emulated LAN |
| IETF | Internet Engineering Task Force |
| ION | Internetworking Over NBMA |
| IP | Internet Protocol |
| LAG | Local Access Group |
| LAN | Local Area Network |
| LANE | LAN Emulation |
| LE | LAN Emulation |
| LEC | LAN Emulation Client |
| LECS | LAN Emulation Configuration Server |
| LIS | Logical IP Subnet |
| MAC | Media Access Control |
| MARS | Multicast Address Resolution Server |
| MPC | MPOA Client |
| MPOA | Multi-Protocol Over ATM |
| MPS | MPOA Server |
| NBMA | Non-Broadcast Multi-Address |
| NHC | Next Hop Client |
| NHRP | Next Hop Resolution Protocol |
| NHS | Next Hop Server |
| SAR | Segmentation and Reassembly |
| TLV | Type, Length, Value |
| VCC | Virtual Channel Connection |
| VCI | Virtual Channel Identifier |
| VPI | Virtual Path Identifier |

The following definitions apply throughout this document.

| Term | Definition |
|---|---|
| Control Flow | A bidirectional flow of control messages (e.g., NHRP and MPOA messages) between two MPOA components (i.e., MPS or MPC). |
| Data Flow | A unidirectional flow of packets to a single destination used by an MPOA component. |
| Default Path | The hop by hop path between routers that a packet would tale in the absence of shortcuts, as determined by routing protocols. |
| Edge Device | A physical device capable of bridging packets between one or more LAN interfaces and one or more LAN Emulation Clients. An Edge Device also comprises one or more MPOA Clients permitting it to forward packets across subnet boundanes using an Internetwork protocol. |
| Egress Cache | The collection of Egress Cache Entries in an MPC. |
| Egress Cache Entry | Information describing how Internetwork Layer packets from a particular shortcut are to be encapsulated and forwarded. |
| Flow | A stream of packets between two entities. Multiple flows may be multiplexed over a single VCC. |
| Ingress Cache | The collection of Ingress Cache Entries in an MPC. |
| Ingress Cache Entry | The collection of information dealing with inbound data flows. This information is used to detect flows that may benefit from a shortcut, and once detected, indicates the shortcut VCC to be used and encapsulation information to be used on the frame. |
| Internetwork Layer | The protocols and mechanisms used to communicate across subnet boundaries, e.g., IP, IPv6, IPX, AppleTalk DDP, SNA, etc. |
| MPOA Client | A protocol entity that implements the client side of the MPOA protocol. |
| MPOA Host | A host containing one or more LAN Emulation Clients allowing it to communicate using LAN Emulation. An MPOA Host contains one or more MPOA Clients allowing it to transmit packets across subnet boundaries using an Internetwork Layer protocol. |
| MPOA Server | A protocol entity that implements the server side of the MPOA protocol. |

| Term | Definition |
| --- | --- |
| Shortcut | An ATM VCC used to forward data packets in lieu of the default routed path. |
| Target | An Internetwork Layer Address to which a shortcut is desired. |

General Description

The present invention is a method of establishing calls between an ingress MPC (the calling party) and an egress MPC (the called party) in MPOA enabled ATM based networks. The present invention comprises a plurality of methods, a portion of which are intended to operate on the ingress MPC and a portion of which are intended to operate on the egress MPC.

To aid in understanding the principles of the present invention, the invention is described in the context of an MPOA based ATM network. Note, however, that the method of the invention example network is described in the context of an MPOA based ATM network for illustration purposes only and is not intended to limit the scope of the invention. It will be appreciated that one skilled in the networking arts can adapt the principles of the present invention to numerous other types of networks as well.

Figure 3:
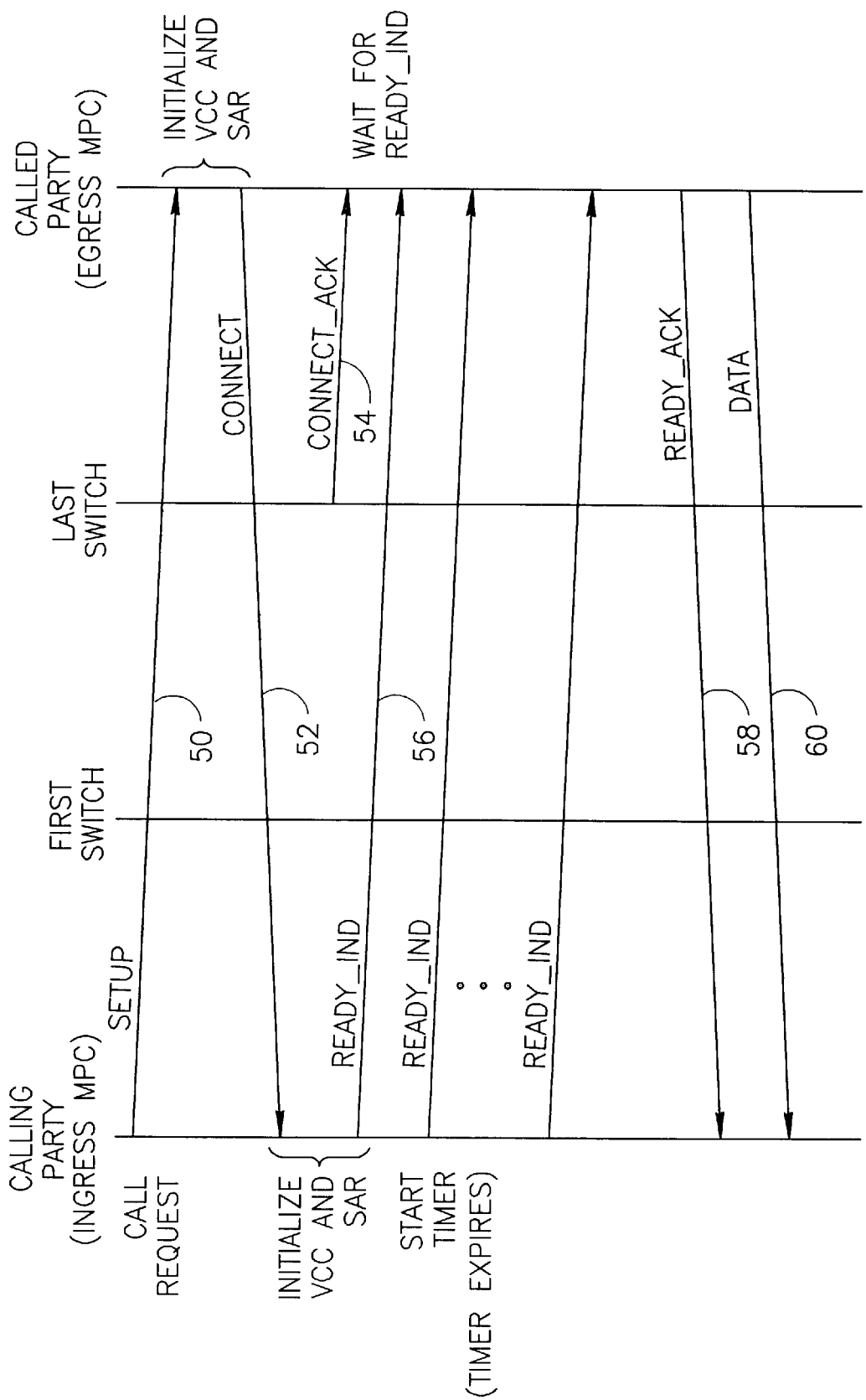
FIG. 3 is a message flow diagram illustrating the call establishment message flow of the method of the present invention.

A message flow diagram illustrating the call establishment message flow of the method of the present invention is shown in FIG. 3. The key feature of the method of the present invention is that the calling party (i.e., ingress MPC) sends a READY_IND message (56) in a reliable manner to the called party (i.e., egress MPC) indicating that it is ready to receive frames over the shortcut VCC. The called party starts sending data over the shortcut VCC only when it knows that the calling party is ready. It knows the calling party is ready when it receives a READY_IND message (56) or data frames (60) on the shortcut VCC. The calling party knows that the called party is ready to receive frames when it receives the CONNECT message (52). Since the READY_IND message sent by the calling party may get lost, the calling party is adapted to re-send the READY_IND message repeatedly until it is sure the called party has received it.

Figure 4:
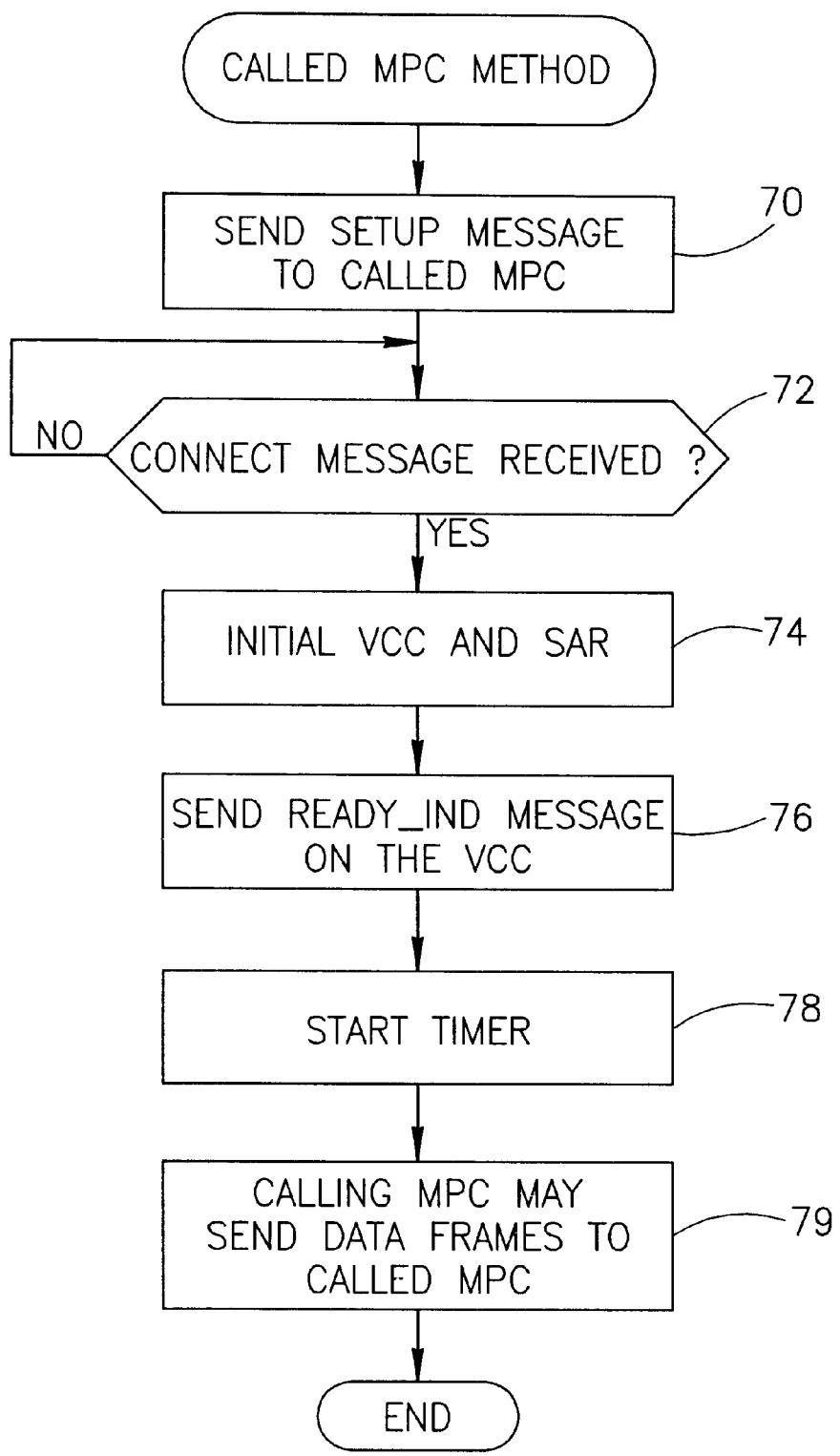
FIG. 4 is a flow diagram illustrating the calling party (ingress MPC) method of the present invention.

The method performed in the calling party will now be described in more detail. A flow diagram illustrating the calling party (ingress MPC) method of the present invention is shown in FIG. 4. With reference to FIGS. 3 and 4, the establishment of a bidirectional shortcut VCC begins with the ingress MPC (i.e., the calling party) initializing a call request SETUP message (50) to the egress MPC (i.e., the called party) (step 70). The called party, upon receipt of the SETUP message, functions to initialize the VCC and the SAR. When the called party is ready to receive frames, it sends a CONNECT message (52) to the calling party.

When the calling party receives the CONNECT message (step 72), it initializes the VCC and its SAR (step 74). Data frames may now be sent to the called party. Only when initialization is complete, does the calling party send a READY_IND message (56) to the called party over the newly established shortcut VCC (step 76). In accordance with the present invention, since the READY_IND message may get lost, the calling party is adapted to start a relatively short timer and wait for the arrival of a READY_ACK message or a data frame from the called party (step 78). Immediately upon receipt of the CONNECT message, the calling party considers call establishment to be complete and may begin to send data frames to the called party over the shortcut VCC any time thereafter (step 79). It then proceeds to periodically check for receipt of an indication from the called party, either a READY_ACK message or data, as described below.

Figure 5:
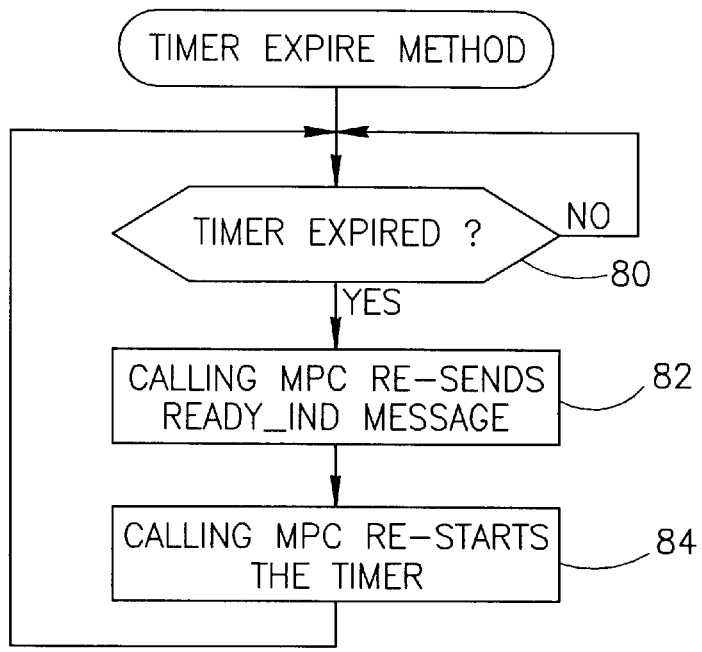
FIG. 5 is a flow diagram illustrating the timer expire portion of the calling party (ingress MPC) method of the present invention.

A flow diagram illustrating the timer expire portion of the calling party (ingress MPC) method of the present invention is shown in FIG. 5. This method is responsible for continuously checking for expiration of the timer started by the calling party at the time the READY_IND message is sent. The duration of the timer is relatively short, being in the range of 10 milliseconds to 1 second, with a preferred typical duration of 200 milliseconds. Note that the duration of the timer of the present invention is much shorter than the 4 second default timer of the called party of the prior art.

When the timer expires (step 80) the calling party re-sends the READY_IND message to the called party over the newly established shortcut VCC (step 82). The calling party then restarts the timer anew (step 84) and continues with step 80, continuously checking for the expiration of the timer.

Figure 6:
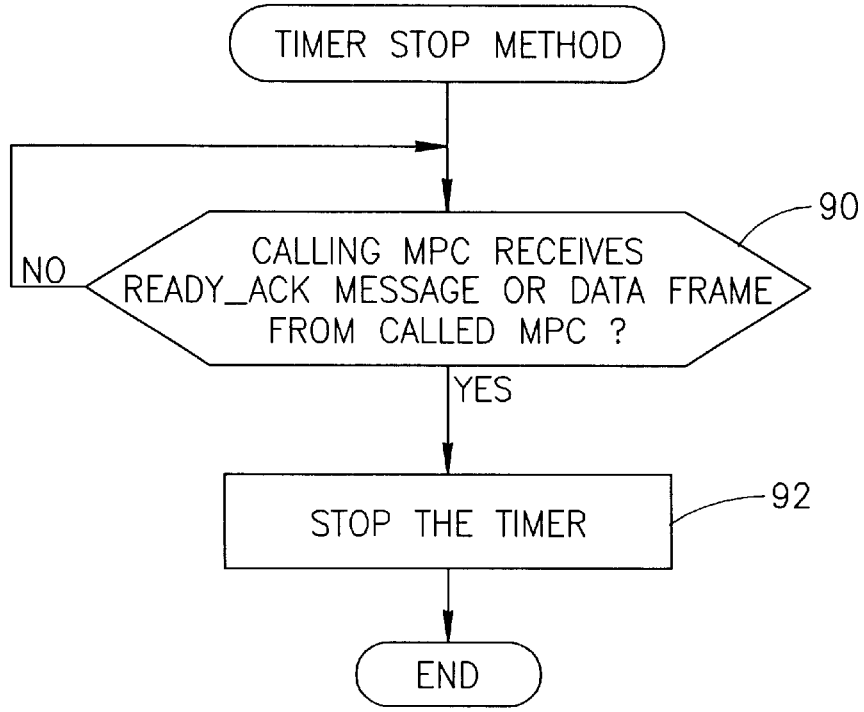
FIG. 6 is a flow diagram illustrating the timer stop portion of the calling party (ingress MPC) method of the present invention.

A flow diagram illustrating the timer stop portion of the calling party (ingress MPC) method of the present invention is shown in FIG. 6. As described above, the calling party periodically re-sends the READY_IND message to the called party to handle the case where the READY_IND message gets lost. Eventually, the called party receives the message and, in response, it sends a READY_ACK message to the calling party and subsequently begins sending data frames. Since the READY_ACK message may get lost, the calling party is adapted to wait for either (1) reception of the READY_ACK message or (2) reception of a data frame (step 90). When either of these two events occurs, the calling party stops the timer (step 92).

Figure 7:
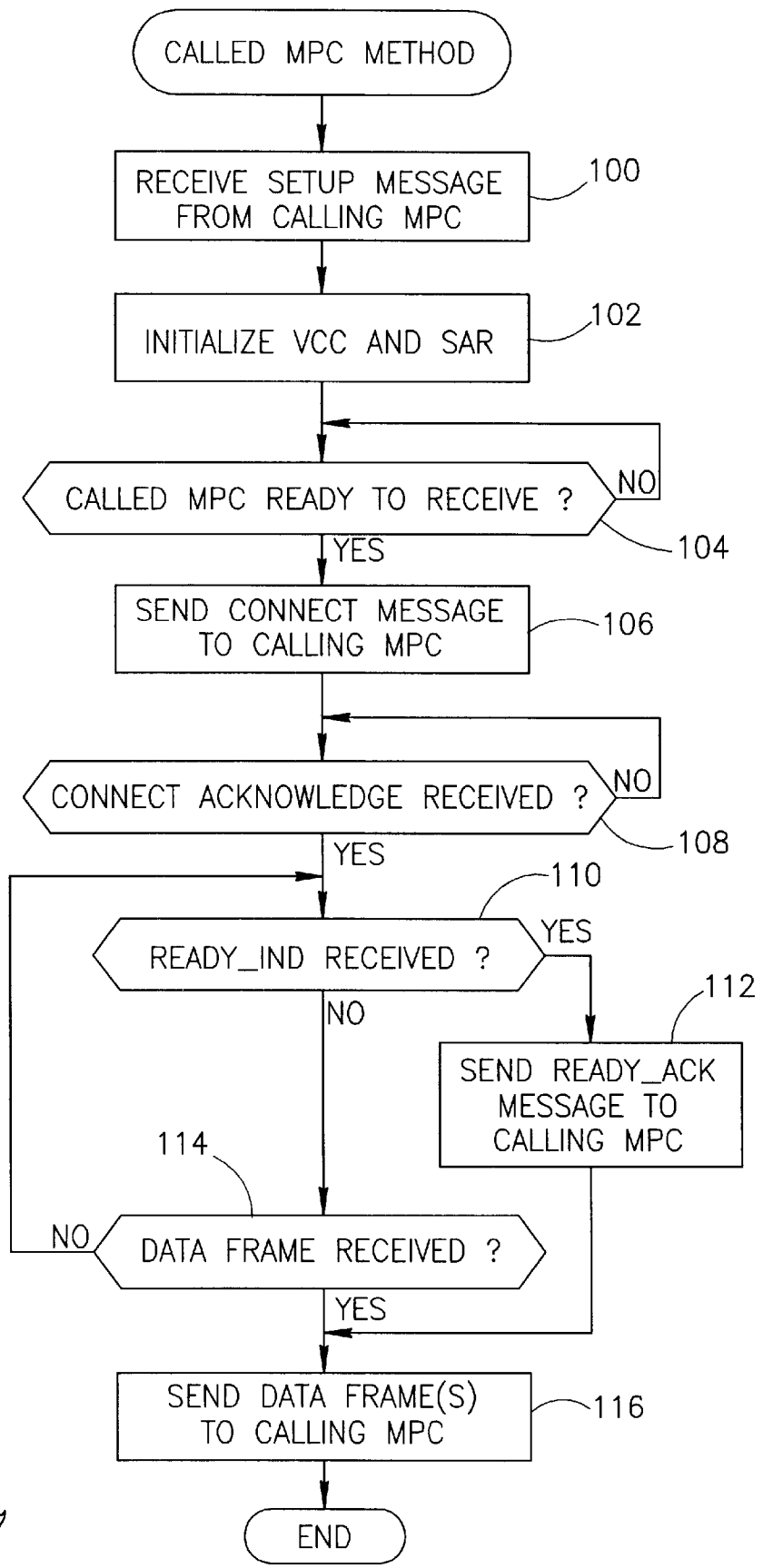
FIG. 7 is a flow diagram illustrating the called party (egress MPC) method of the present invention.

The method performed in the called party will now be described in more detail. A flow diagram illustrating the called party (egress MPC) method of the present invention is shown in FIG. 7. With reference to FIGS. 3 and 7, initially, the calling party sends a SETUP request message (50 FIG. 3) to the called party. The called party receives the SETUP message (step 100) and initializes the VCC and its SAR (step 102). When the called party is ready to receive frames (step 104) it sends the CONNECT message (52) to the calling party (step 106). The called party then waits for the CONNECT_ACK message (54) to be received (step 108).

When it receives the CONNECT_ACK message, the called party does not begin sending data. The called party waits for the receipt of either a READY_IND message (56) or a data frame over the newly established shortcut VCC from the calling party. If a READY_IND message is received (step 110), the called party replies by sending the READY_ACK message (58) to the calling party (step 112). The called party then begins sending data frames to the calling party over the shortcut VCC (step 116).

If a data frame is received (step 114) rather than a READY_IND message, it indicates that the calling party is ready to receive and that the READY_IND message was lost. In this case, the called party starts sending data frames over the shortcut VCC without sending the READY_ACK message (step 116).

A frame format suitable for use with the method of the present invention is derived from the MPOA control message format described in Section 5.3.2 of the ATM MPOA Version 1.0 specification. The MPOA control message is conveyed using the NHRP packet format and comprises a fixed header portion. An indication of the message type can be placed within this fixed header. The specification defines a plurality of packet type values (ar$op.type) for MPOA control messages. Two additional types may be defined for use with the present invention as shown below in Table 1.

| ar$op.type | MPOA Control Message |
|---|---|
| 0 × 90 | MPOA Ready_Ind |
| 0 × 91 | MPOA Ready_Ack |

The common header, client information header and extension portions may comprise those specified in the MPOA standard. Note, however, the client information header and extensions are not required for use with the method of the present invention.

The method of the present invention functions to shorten the call establishment process in the called party. The primary goal of the present invention is to minimize the time it takes the called party to complete the establishment of the shortcut VCC, i.e., to get the READY_IND message from the calling party. As described above, the invention provides for the case when either the READY_IND sent by the calling party or the READY_ACK sent by the called party gets lost.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. In an Asynchronous Transfer Mode (ATM) based Multiple Protocol Over ATM (MPOA) network, a method of establishing a bidirectional shortcut Virtual Channel Connection (VCC) between a calling party and a called party said method comprising the steps of:

initiating a call request by sending a setup message from said calling party to said called party;

initializing said called party and sending a connect message to said calling party;

initializing said calling party and sending a ready indication message to said called party on said shortcut VCC when said calling party is ready to receive data;

periodically re-sending said ready indication message to said called party until a ready acknowledge message or data frame is received by said calling party; and sending data from said called party to said calling party upon receipt by said called party of said ready indication message or at least one data frame.

2. The method according to claim 1, wherein said step of initializing said call request comprises the step of sending a SETUP request message as described in the ATM User-to-Network (UNI) Signaling 3.0/3.1 standard.

3. The method according to claim 1, wherein said step of sending a connect message comprises the step of sending a CONNECT message as described in the ATM User-to-Network (UNI) Signaling 3.0/3.1 standard.

4. The method according to claim 1, wherein said step of initializing said called party comprises the step of initializing said shortcut VCC and associated Segmentation and Reassembly (SAR) function.

5. The method according to claim 1, wherein said step of initializing said calling party comprises the step of initializing said shortcut VCC and associated Segmentation and Reassembly (SAR) function.

6. The method according to claim 1, wherein said ready indication message comprises an MPOA Control Message adapted to have a fixed header comprising an indication identifying the message as a ready indication message.

7. The method according to claim 6, wherein said fixed header comprises an ar$op.type field adapted to indicate a ready indication message.

8. The method according to claim 1, wherein said step of periodically re-sending said ready indication message comprises starting a timer and restarting said timer upon its expiration.

9. The method according to claim 8, wherein the duration of said timer is set to within the range of 10 milliseconds to 1 second.

10. The method according to claim 8, wherein the duration of said timer is set to 200 milliseconds.

11. The method according to claim 1, further comprising the step of sending data from said calling party to said called party upon receipt by said calling party of a connect message.

12. The method according to claim 11, wherein said connect message comprises an ATM UNI 3.0/3.1 CONNECT message.

13. The method according to claim 1, wherein said ready acknowledge message comprises an MPOA Control Message adapted to have a fixed header comprising an indication identifying the message as a ready acknowledge message.

14. The method according to claim 13, wherein said fixed header comprises an ar$op.type field adapted to indicate a ready acknowledge message.

* * * * *